United States Patent
Deselaers et al.

(10) Patent No.: US 12,018,949 B2
(45) Date of Patent: Jun. 25, 2024

(54) PROVIDING NAVIGATION INSTRUCTIONS TO ONE DEVICE IN VIEW OF ANOTHER DEVICE

(71) Applicant: GOOGLE LLC, Mountain View, CA (US)

(72) Inventors: Thomas Deselaers, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/611,453

(22) PCT Filed: Nov. 7, 2018

(86) PCT No.: PCT/US2018/059588
§ 371 (c)(1),
(2) Date: Nov. 6, 2019

(87) PCT Pub. No.: WO2020/096584
PCT Pub. Date: May 14, 2020

(65) Prior Publication Data
US 2021/0333115 A1    Oct. 28, 2021

(51) Int. Cl.
*G01C 21/34* (2006.01)
*G01C 21/36* (2006.01)
(Continued)

(52) U.S. Cl.
CPC ..... *G01C 21/3438* (2013.01); *G01C 21/3691* (2013.01); *G06N 5/04* (2013.01);
(Continued)

(58) Field of Classification Search
CPC ............ G01C 21/3438; G01C 21/3691; G01C 21/362; G06N 5/04; G06N 20/00;
(Continued)

(56) References Cited

U.S. PATENT DOCUMENTS 8,744,666 B2   6/2014   Switkes et al.
8,775,059 B2   7/2014   Heed et al.
(Continued)

FOREIGN PATENT DOCUMENTS

CN    104344833 A    2/2015
CN    105051496 A    11/2015
(Continued)

OTHER PUBLICATIONS

Translation of EP 3051258-A2; Aug. 3, 2016.*
(Continued)

*Primary Examiner* — Adam D Tissot
(74) *Attorney, Agent, or Firm* — MARSHALL, GERSTEIN & BORUN LLP

(57) ABSTRACT

A navigation service determines that a first user intends to navigate to a shared destination from a first location, at a first time, and that a second user intends to navigate to the shared destination from a second location, at a second time within a threshold interval of the first time. The navigation service notifies the first user using an electronic notification that the second user intends to navigate to the shared destination, receives from the first user an electronic request to coordinate navigation to the shared destination with the second user, and in response to receiving the electronic request, provides navigation directions to the shared destination to a device associated with the first user in view of a progress of the second user toward the shared destination.

21 Claims, 9 Drawing Sheets

(51) Int. Cl.
  *G06N 5/04* (2023.01)
  *G06N 20/00* (2019.01)
  *H04L 51/046* (2022.01)

(52) U.S. Cl.
  CPC ........... *G06N 20/00* (2019.01); *H04L 51/046* (2013.01); *G01C 21/362* (2013.01)

(58) Field of Classification Search
  CPC ............ H04L 51/046; B60W 2556/50; B60W 2556/55; B60W 2556/65; G08G 1/0968; G08G 1/0967
  See application file for complete search history.

(56) References Cited

U.S. PATENT DOCUMENTS

| | | | |
|---|---|---|---|
| 9,076,341 B2 | 7/2015 | Funabashi | |
| 9,645,579 B2 | 5/2017 | Switkes et al. | |
| 9,665,102 B2 | 5/2017 | Switkes et al. | |
| 9,786,182 B2 | 10/2017 | Calmettes et al. | |
| 2005/0283308 A1* | 12/2005 | Szabo | G01C 21/3438 701/411 |
| 2007/0168118 A1* | 7/2007 | Lappe | G01C 21/005 701/408 |
| 2008/0167937 A1 | 7/2008 | Coughlin et al. | |
| 2010/0153160 A1 | 6/2010 | Bezemer et al. | |
| 2013/0019185 A1 | 1/2013 | Zhang | |
| 2013/0041576 A1* | 2/2013 | Switkes | G01S 13/931 701/123 |
| 2014/0313058 A1 | 10/2014 | Chen et al. | |
| 2015/0153186 A1 | 6/2015 | Geelen et al. | |
| 2016/0290816 A1* | 10/2016 | Bauer | G01C 21/3438 |
| 2017/0097240 A1 | 4/2017 | Murrish et al. | |
| 2017/0248433 A1 | 8/2017 | Mahajan | |
| 2017/0284818 A1* | 10/2017 | Boss | H04W 4/08 |
| 2017/0308097 A1 | 10/2017 | Switkes et al. | |
| 2017/0323249 A1 | 11/2017 | Khasis | |
| 2017/0370746 A1 | 12/2017 | Falk et al. | |
| 2020/0056899 A1* | 2/2020 | Gandiga | G08G 1/096827 |
| 2020/0080853 A1* | 3/2020 | Tam | G05D 1/0276 |

FOREIGN PATENT DOCUMENTS

| | | | | |
|---|---|---|---|---|
| CN | 105764033 A | 7/2016 | | |
| CN | 107276886 A | 10/2017 | | |
| CN | 108731695 A | 11/2018 | | |
| EP | 1621896 A1 | 2/2006 | | |
| EP | 3051258 A2 * | 8/2016 | ......... | G01C 21/3438 |
| EP | 3123459 A1 | 2/2017 | | |
| JP | 5018234 B2 | 9/2012 | | |
| WO | WO-2013/103978 A2 | 7/2013 | | |
| WO | WO-2017/039546 A1 | 3/2017 | | |

OTHER PUBLICATIONS

Translation of EP3051258-A2;Aug. 3, 2016 (Year: 2016).*
International Search Report and Written Opinion for Application No. PCT/US2018/059588, dated Oct. 22, 2019.
Kim et al., Learning User Preferences and Understanding Calendar Contexts for Event Scheduling, arxiv.org, Cornell Unviersity Library, XP081422500 (Sep. 2018).
Office Action for European Patent Application No. 18836681.9, dated Mar. 14, 2023.
Office Action for Chinese Application No. 201880095234.5, dated Dec. 25, 2023.

* cited by examiner

PROVIDING NAVIGATION INSTRUCTIONS TO ONE DEVICE IN VIEW OF ANOTHER DEVICE

FIELD OF THE DISCLOSURE

The present disclosure relates to navigation and, more particularly, to generating navigation directions for users in view of other users travelling to the same location.

BACKGROUND

Today, numerous electronic devices such as personal computers, tablets, mobile phones, navigators provided as special-purpose devices or embedded into head units of vehicles, etc. can provide digital maps of geographic areas as well as step-by-step directions for navigating through geographic areas by driving, walking, bicycling, or using public transport. Special-purpose geographic applications or "apps" as well as general-purpose applications such as web browsers can provide digital maps and/or navigation directions using locally stored data or data received from network servers.

These applications and services generally attempt to optimize navigation directions, in terms of time and/or price for example, for an individual user. When users drive their respective vehicles to the same destination, the navigation applications and services provide independent guidance to the individual drivers. Further, when people drive multiple cars together (in a "caravan" or "convoy"), drivers often follow the lead car.

SUMMARY

The navigation service of this disclosure coordinates navigation when multiple parties travel to a common destination. As discussed in more detail below, the navigation service can identify situations in which users are likely travel to the same place within a certain period of time, based on explicit requests from users or various implicit signals. The users can travel to the same destination from the same starting location or from different locations. In the latter case, the navigation service can identify a shared portion of the route. During a multi-car navigation session, the navigation service can provide various types of guidance to the participants, including indications of current locations of the participants, notifications regarding traffic and road conditions determined by the lead vehicle, suggestions regarding stops along the route, etc. Further, the navigation service can determine when navigation routes of the individual users merge and identify potential locations at which the navigation routes can merge, and where drivers can wait for each other. Still further, after some but not all of the participants arrive at the shared destination, the navigation service can coordinate parking and other related activities.

One example implementation of these techniques is a method of operation of a navigation system to coordinate navigation between multiple users. At least some of the steps of the method can be executed by one or more processors. The method includes determining that a first user intends to navigate to a shared destination from a first location, at a first time; determining that a second user intends to navigate to the shared destination from a second location, at a second time within a threshold interval of the first time; notifying the first user using an electronic notification that the second user intends to navigate to the shared destination; receiving, from the first user, an electronic request to coordinate navigation to the shared destination with the second user; and in response to receiving the electronic request, providing navigation directions to the shared destination to a device associated with the first user in view of progress of the second user toward the shared destination.

In some implementations, the method above includes one or more of the following features. Determining that the first user intends to navigate to the shared destination includes determining that the first user and the second user have respective calendar entries referencing the shared destination. Determining that the first user intends to navigate to the shared destination includes determining that electronic messaging between the first user and the second user references the shared destination. Determining that the first user intends to navigate to the shared destination includes receiving a request from the first user, submitted via a user interface of the device operated by the first user, to coordinate navigation to the shared destination with the second user. The method includes applying a machine learning model to first data related to the first user and second data related to the second user to generate a confidence score indicative of a probability that the first user and the second user will choose to coordinate navigation to the shared destination, the first and the second data including one or more of (i) sensor data from respective user devices, (ii) calendar entries for the first user and the user second user, or (iii) messaging between the first user and the second user; where the notification of the first user that the second user intends to navigate to the shared destination is in response to determining that the confidence score is above a certain threshold value. The method includes determining that the first user will arrive at the shared destination earlier than the second user and providing an indication that the first user will arrive at the shared destination earlier to the device associated with the first user; the method in some cases further includes determining that the first user is ahead of the second user by at least a threshold distance or drive time, identifying a location at which the first user can wait for the second user, and notifying the first user of the identified location; and identifying the location at which the first user can wait for the second user in some cases includes identifying a gas station along the shared route where both the first user and the second user can arrive within a certain period of time. The method includes determining a first route from the first location to the destination and a second route from the second location to the shared destination, identifying a shared route corresponding to at least a portion of the first route shared with the second route, and providing an indication of the shared route to the respective devices associated with the first user and the second user; the method in some cases also includes, in response to determining that the device associated with the first user traversed a segment of the shared route while the device associated with the second user has not yet reached the segment, obtaining road quality and/or traffic data for the segment, and providing the road quality and/or traffic data to a device associated with the second user. The method includes determining a first route from the first location to the destination and a second route from the second location to the shared destination, identifying a shared route corresponding to at least a portion of the first route shared with the second route, and providing an indication of the shared route to the respective devices associated with the first user and the second user. The method includes determining that the first user is likely to stop on the way to the shared destination, determining a location at which the first user and a second user can stop, and providing an indication of the location to the device associated with the first user and to the device associated with the second user. Providing navigation directions to the shared destination to the first user includes determining that the first user is ahead of the second user by at least a threshold distance or drive time, identifying a point where the first user and the second user can arrive at proximate times, and modifying the navigation directions to generate a detour for the first user to arrive at the identified point later than along an original route of the first user. The method includes automatically setting up a voice chat for the first user and the second user in response to receiving the electronic request. The method includes determining a first route from the first location to the destination and a second route from the second location to the shared destination, identifying a shared route corresponding to at least a portion of the first route shared with the second route, determining that the first user has deviated from the shared route to follow a detour for a portion of the shared route, and modifying navigation directions for the second user based on the detour. The method includes determining that the first user has arrived at the shared destination and providing an interactive prompt to the first user for reporting parking spaces.

Another example of these techniques is a system comprising one or more computing devices and a non-transitory computer-readable medium storing instructions. When executed by the one or more computing devices, the instructions cause the system to execute a method according to any of the claims above.

Another embodiment of these techniques is a method in a computing device for obtaining navigation directions. The method includes receiving, from a network server, an invitation to join a multi-car navigation group to travel to a shared destination and displaying the invitation to join the multi-car navigation group via a user interface. If the user accepts the invitation to join the multi-car navigation group, the method includes transmitting a notification that the user accepted the invitation to the network server and, during a multi-car navigation session, providing updates regarding progress of the computing device toward the shared destination and receiving updates regarding progress of other participants in the multi-car navigation group toward the shared destination.

Still another embodiment of these techniques is a method in a computing device for navigation directions. The method includes receiving, via a user interface from a user, a request to provide navigation directions to a destination, determining whether the user selected a multi-car navigation option and, if so, transmitting a request for navigation directions to the destination along with an indication that the multi-car navigation option has been selected. The method further includes providing updates regarding progress of the computing device toward the shared destination and receiving updates regarding progress of other participants in the multi-car navigation group toward the shared destination.

DETAILED DESCRIPTION

Generally speaking, a navigation service of this disclosure can be implemented in one or more network servers and/or portable devices to provide multi-car navigation directions. According to multi-car navigation directions, the status of one client device participating in a multi-car navigation session affects navigation directions for another user device participating in the multi-car navigation session. As discussed in more detail below, the navigation service can receive an explicit request from a user to navigate to a shared destination with one or more other users, or detect a possibility of multi-car navigation based on various implicit signals. During a multi-car navigation session, signals related to a client device and having a potential impact on navigation directions for another client device can include the current location of the client device, differences in progress toward the shared destination between client devices, planned and unplanned stops along the way, traffic and road conditions the client device detects for a certain portion of the shared route, etc. The navigation service can provide guidance the participants in a multi-car navigation session during navigation and after one of the participants reaches the shared destination.

Figure 1:
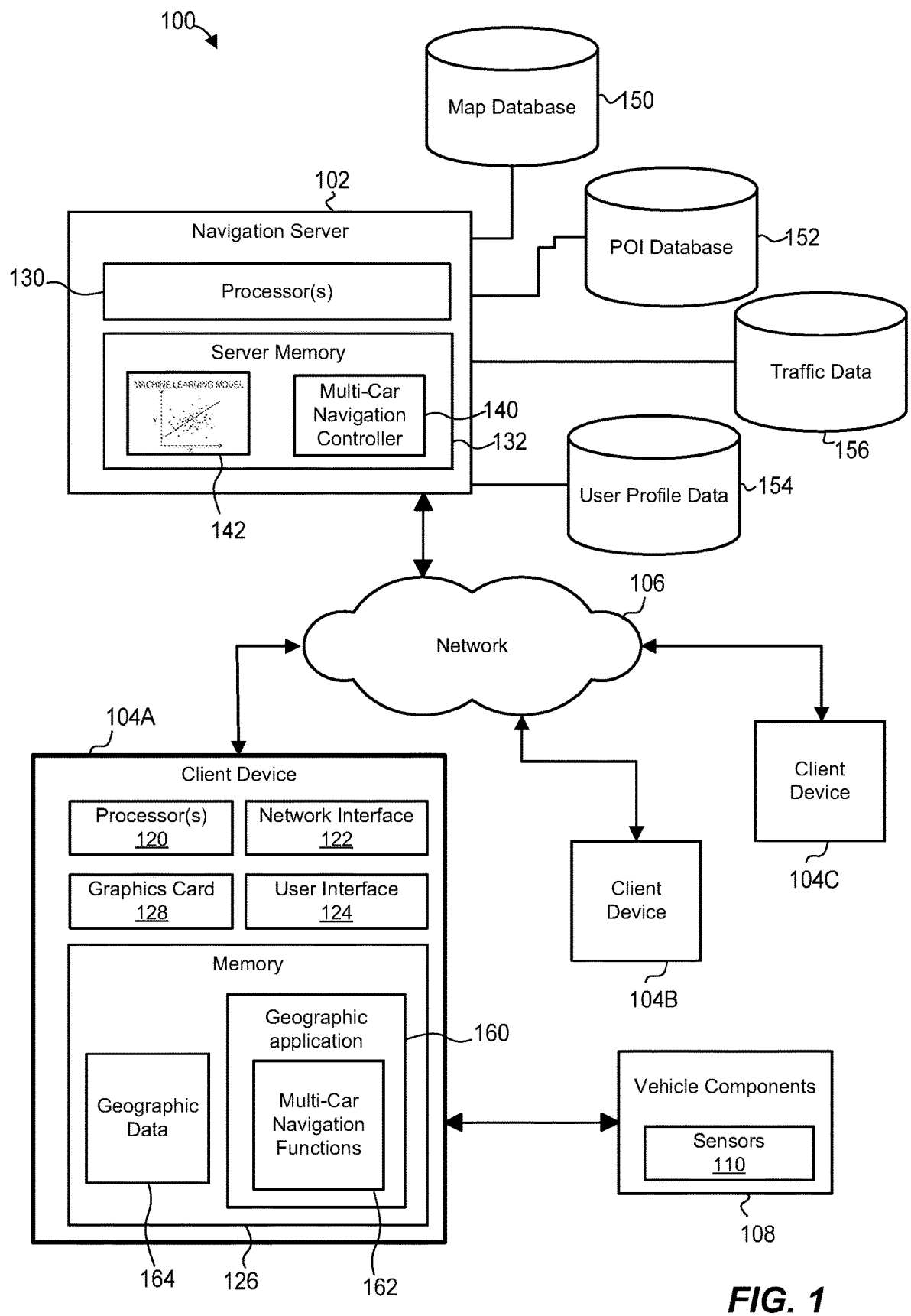
FIG. 1 is a block diagram of an example system in which a navigation service coordinates multi-car navigation between several client devices.

Referring first to FIG. 1, a system 100 can include a navigation server 102 coupled to various client or client devices 104A, 1046, 104C, etc. via a communication network 106 which can be a wide area network (WAN) such as the Internet.

The client device 104A in one example implementation operates as a component of a vehicle. For example, the client device 104A can be a navigation device embedded in the head unit of the vehicle to provide mapping, navigation, search, and other functionality. The client device 104A in this implementation can be communicatively coupled to vehicle components 108 which can include various sensors 110 that indicate location, orientation, speed, temperature, various operational parameters of the vehicle such as tire pressure or whether the windshield wipers have been activated, etc.

In another implementation, the client device 104A is a portable computing device such as a smartphone that is communicatively coupled to the head unit of a vehicle via a wired or wireless short-range network interface such as Universal Serial Bus (USB)™ or Bluetooth®. In yet another implementation, the client device 104 does not rely on any sensors or input/output devices of the vehicle. More generally, the client device 104A can be any suitable computing device such as a laptop computer, a tablet computer, a wearable device, etc. In any case, a user can operate the client device 104A in a vehicle. Depending on the scenario, the user of the client device 104A is a driver or a passenger in the vehicle.

The client or user device 104A can include one or more processors 120, a network interface 122 configured to communicate with the map data server 102 and other devices using any suitable protocols via the network 106. The client device 104A also can include a user interface 124 configured to receive typed input, gesture-based input, voice input, etc. and to display images, output audio, and generate haptic output for example. The user interface 124 in an example implementation includes a touchscreen. Further, the client device 104A can include a non-transitory computer-readable memory 126 and a graphics card 128 (e.g., including one or more graphics processing units, or GPUs). The memory 126 can include persistent components (e.g., a hard disk) as well as non-persistent components (e.g., RAM). In other implementations, the client device 104A may include additional components or, conversely, not include some of the components illustrated in FIG. 1. The client devices 104B and 104C similarly can be portable user devices, embedded devices, etc.

The navigation server 102 can be a network server implemented as a single device or as a group of devices. One or more of these devices can include one or more processors 130 and a non-transitory computer-readable memory 132 that stores instructions executable on the one or more processors 130. These instructions can implement, among other software components, a multi-car navigation controller 140. More generally, the navigation server 102 can include any suitable type of processing hardware that implements various navigation and mapping functions. The non-transitory computer-readable memory 132 also can store a machine learning (ML) model 142. The multi-car navigation controller 140 can utilize the ML model 142 to identify situations in which multi-car navigation may be desirable, as discussed in more detail below.

The navigation server 102 can be coupled to a map database 150, a point-of-interest POI database 152, a user profile database 154, and a traffic database 156. Each of the databases 150, 152, 154, and 156 can be implemented in a single storage device or multiple storage devices.

The geographic database 150 can store map data that includes descriptions of geometry for various map features such as buildings and other structures, roads, parks, bodies of water, etc. Besides roads designed for vehicles, the map data can describe bicycle paths, pedestrian paths, railway paths, shipping routes, airlines routes, etc. Map features can be defined in a vector graphics format, according to which images are described in terms of geometrical primitives based on mathematical expressions, or another suitable scalable format. Depending on the implementation, map features can be defined in two dimensions (2D) only, in three dimensions (3D) as wireframes to which raster textures are applied, in "two-and-a-half" dimensions (2.5D) as 2D polygons "extruded" into the third dimension, etc. In some cases, map data also can include raster images in a bitmap format, for example. Further, map data also can include text label and various forms of metadata such as links to remote resources.

The geographic database 150 can store the map data in the format of map tiles that generally correspond to a 2D organization of geospatial data into a quadtree. Each tile at a given zoom level is divided into four tiles at the next level up to the highest level of magnification. Similarly, 3D organization of geospatial data can be implemented using octrees, in which a cubic volume contains map geometry at a certain zoom level and is subdivided into eight cubic volumes at the next zoom level, with each of the eight cubic volumes typically containing a more detailed map geometry. To map the surface of the Earth onto a plane for 2D representation, Mercator or another suitable projection can be used. Although the examples below refer to map data organized into 2D map tiles, these techniques can also be extended to 3D map data organized into octrees.

The POI database 152 can store geographic coordinates of various places. For some of the places, the POI database 152 can store business data such as hours of operation, a description of products and services offered, user reviews, etc. The POIs need not always correspond to businesses and also can include landmarks (e.g., monuments, fountains), prominent buildings and other structures, locations of events, etc. Further, the POI database 152 can store speech recognizer models that can be used to detect local queries, e.g., names of local POIs or other locally common phrases.

The user profile database 154 can store various preferences and profile settings for the users of the client devices 104A, 104B, 104C. One of these settings can indicate whether the user is interested in multi-car navigation. Further, in some implementations, when the user has expressed interest in multi-car navigation, the user profile database 154 stores a list of users with whom the user can participate in multi-car navigation.

The traffic database 156 can store information related to current conditions of roads. For a certain road segment, the traffic database 156 can store for example indications of traffic (light, moderate, heavy), road repairs, lane closures, accidents, etc. As discussed below, a client device operating in a lead vehicle in some scenarios provides traffic data to other client devices in the multi-car navigation group, and the navigation system in some cases can update the traffic database 156 using this data.

Still referring to FIG. 1, the memory 126 of the client device 104A can store instructions that implement various software applications such as a geographic application 160. The geographic application 160 can generate interactive digital maps, obtain navigation directions, provide data related to geolocated businesses in response to geographic queries, retrieve and display geographic commercial data such as coupons and offers, etc. The geographic application 160 can implement multi-car navigation functions 162 such as requesting that the client device 104A join a multi-car navigation group, processing invitations from the client devices 1048 and 104C to join a multi-car navigation group, providing updates to other participants in a multi-car navigation group, receiving updates from other participants in a multi-car navigation group, etc. Depending on the implementation, the geographic application 160 can operate as a standalone application or as a component of another application such as a web browser, for example.

In addition to instructions that implement the geographic application 160, the memory 126 of the client device also can store geographic data 164 that include map tiles, POI data, etc. for one or more geographic areas of offline coverage.

The navigation server 102 and, in some cases, one or more instances of the geographic application 160 executing in the respective client devices can operate as parts of a navigation service of this disclosure. Some of the methods discussed below can be implemented in the navigation server 102, some can be implemented in the geographic application 160, and some can be implemented partially in the navigation server 102 and partially in the geographic application 160.

Figure 2:
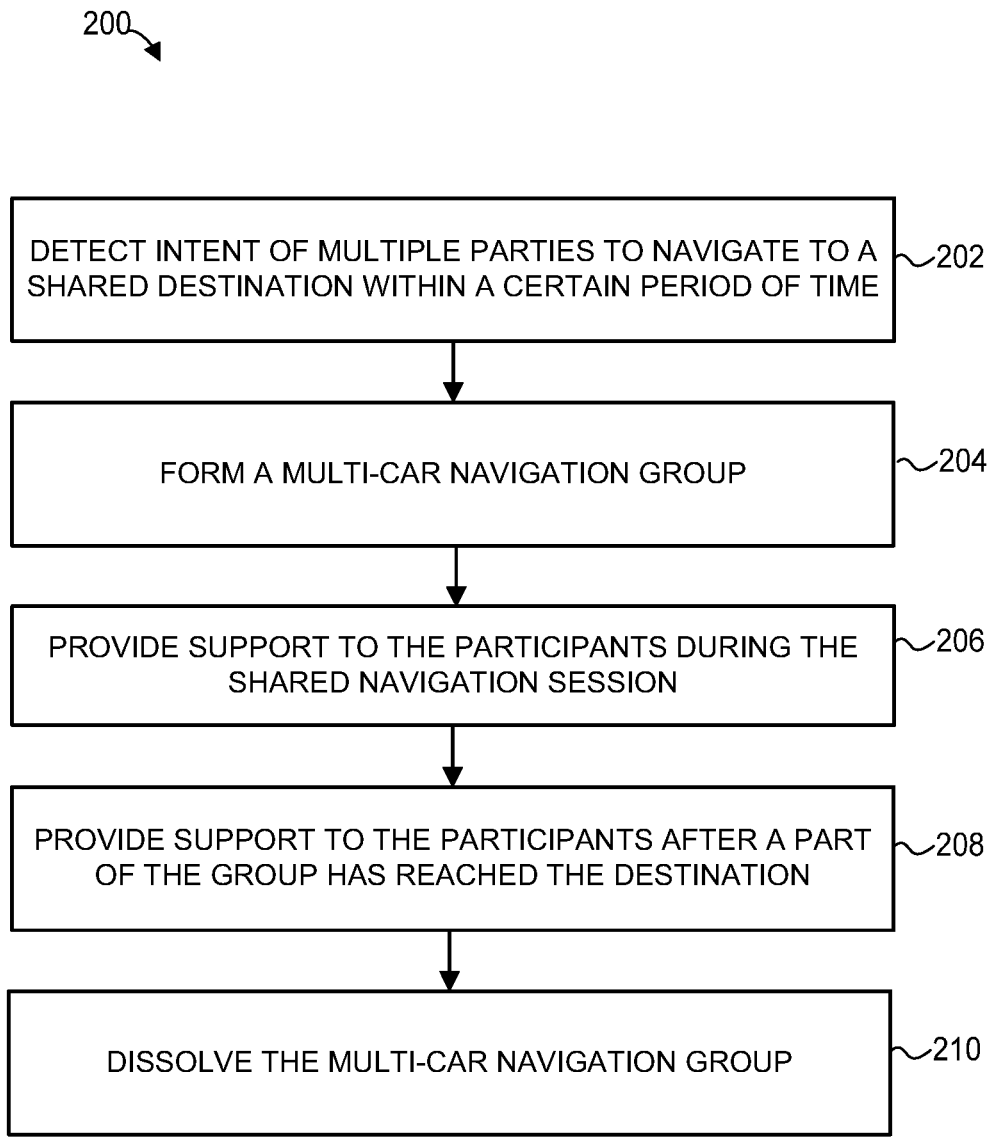
FIG. 2 is a flow diagram of an example method for coordinating a multi-car navigation session, which can be implemented in the system of FIG. 1.

Referring to FIG. 2, a method 200 for coordinating a multi-car navigation session in an example embodiment of the techniques of this disclosure is implemented in the multi-car navigation controller 140 of the navigation server 102. More generally, the method 200 can be implemented as a part of a navigation service in any suitable device or group of devices.

The method 200 begins at block 202, where the navigation service detects an intent of multiple parties to navigate to a shared destination within a certain period of time. To this end, the navigation service can use explicit and/or implicit signals. Examples of such signals are discussed below with reference to FIG. 3. After the navigation service identifies two or more potential participants in a multi-car navigation session, the navigation service can form a multi-car navigation group at block 204 and accordingly forward notifications to the corresponding client devices, e.g., the client devices 104A-C of FIG. 1.

At block 206, the navigation service can provide support to the client devices during the multi-car navigation session. As discussed in more detail below with reference to FIG. 4, the navigation service can notify client devices of current locations of other client devices, identify portions of navigation routes the client devices share (in those cases when the client devices depart from different starting locations), monitor distances between vehicles in the multi-car navigation group, identify and suggest locations where the drivers can meet, etc.

At block 208, after some but not all of the client devices reach the shared destination, the navigation service can provide further support to some or all of the participants at block 208. For example, a multi-car navigation group can include users of the client devices 104A, 1046, and 104C. After the user of the client device 104A reaches the destination, the navigation service can automatically prompt the user to provide an indication of parking spaces. As a more specific example, the navigation service can cause the geographic application 160 to provide an interactive map on which the user of the client device 104A can indicate the available parking he or she observes by clicking, tapping, voice input, etc. As another example, the navigation service can automatically determine that, after the user of the client device 104A has reached the shared destination, the user continues to drive according to a pattern that indicates lack of parking spaces, and provide an appropriate indication to the other users in the multi-car navigation group. As yet another example, upon determining that parking is difficult to find at the shared destination, the navigation service can automatically direct the users in the multi-car navigation group to different side streets, parking lots, or parking garages in the vicinity of the shared destination, so that the users in the multi-car navigation group do not compete for the same spots or create traffic congestion.

The navigation service can dissolve the multi-car navigation group at block 210. Depending on the implementation and/or scenario, the navigation service can dissolve the group when every user in the group has reached the destination, when a certain number of users in the group has reached the destination, or in response to an explicit request from one of the users.

Further, the navigation service can allow individual users to leave a multi-car navigation group without dissolving the entire group. For example, the geographic application 160 can provide, to a user participating in a multi-car navigation session, an interactive control for indicating that the user wishes to leave the group. Thus, when the user actuates the interactive control, the navigation service continues to coordinate navigation of the remaining multi-car navigation group. Otherwise, when the client deviates from the route without indicating that he or she is leaving the group, the navigation service can guide the user back to the group, as discussed with reference to FIG. 4 below. Still further, the navigation service in some cases can allow a new user to join a multi-car navigation group after the group has made some progress toward the shared destination.

Figure 3:
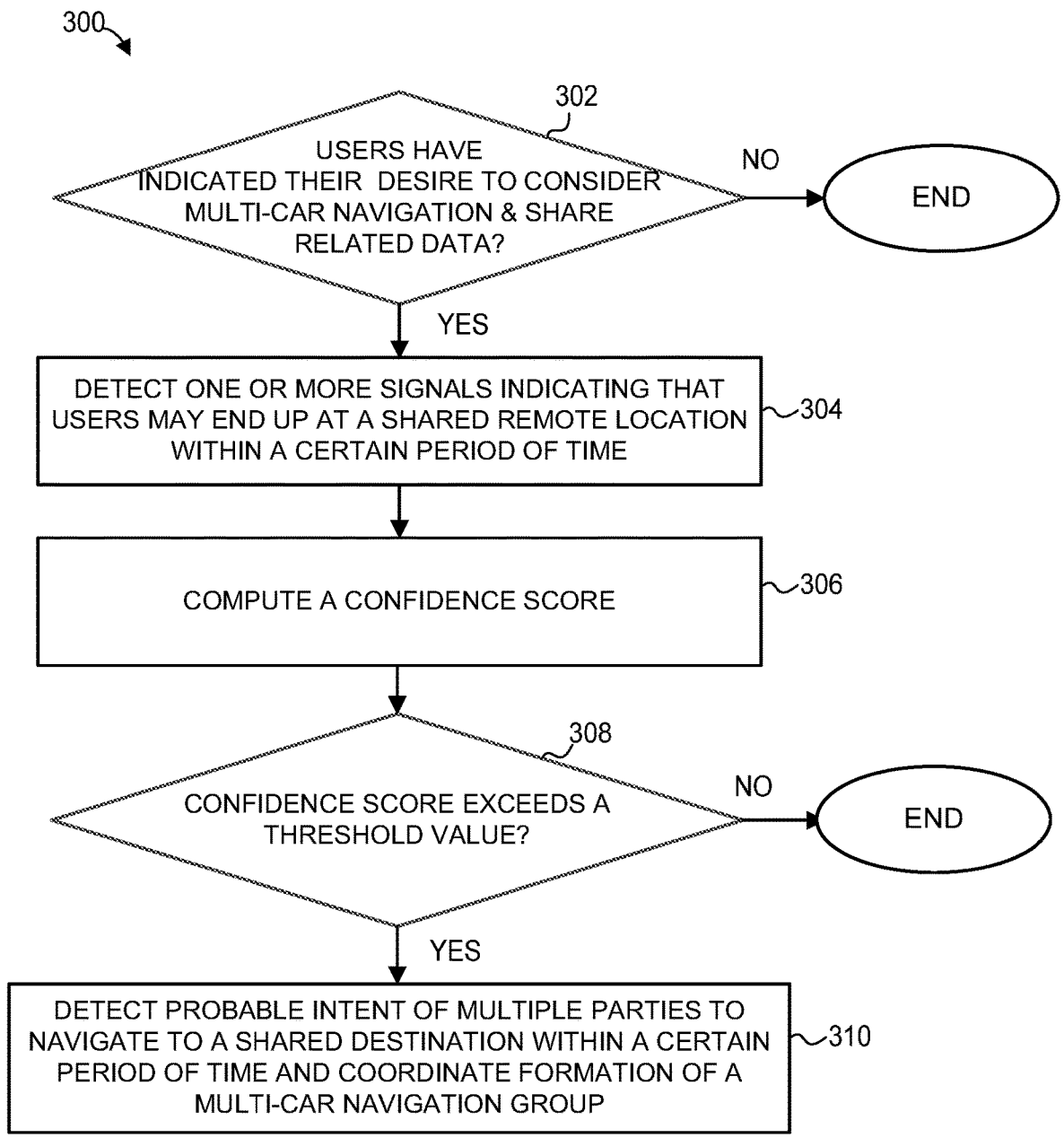
FIG. 3 is a flow diagram of an example method for identifying a potential multi-car navigation session, which can be implemented in the system of FIG. 1.

Now referring to FIG. 3, an example method 300 for identifying a potential multi-car navigation session also can be implemented in the multi-car navigation controller 140 of the navigation server 102. In another implementation, the method 300 can be implemented in a distributed manner in several instances of the geographic application 160 operating in the respective client device. The method 300 in any case can be implemented as a part of a navigation service.

Generally speaking, the navigation service can receive explicit indications from users that they wish to join multi-car navigation sessions or, in some scenarios, determine that certain users likely are interested in multi-car navigation based on implicit signals. In the former case, a user can indicate to another user or a group of users that he or she intends to travel to a certain destination and sends an invitation to join a multi-car navigation via the geographic application 160. In the latter case, the navigation service can first determine whether it can use certain user-specific information, which can be stored in the user profile data 154 (see FIG. 1).

For example, at block 302, the navigation service can determine whether a user has indicated his or her desire to be considered a potential candidate for multi-car navigation sessions and whether the user wishes that the navigation service consider certain data, such as calendar data and messaging data, when suggesting multi-car navigation. In some implementations, the user can indicate this desire by operating certain controls and/or installing certain applications. In an example implementation, the user can specify specific people or a group of people (e.g., family) with whom the user potentially would like to form multi-car navigation groups. The method 300 ends if the navigation service determines that the user does not wish that the navigation service utilize his or her data in this manner or is not interested in multi-car navigation, and proceeds to block 304 otherwise.

At block 304, the navigation service detects one or more signals indicating that certain users may end up at a shared remote location within a certain period of time. In one example scenario, the navigation service determines that two or more users (who have indicated that the navigation service can use their calendar data when identifying multi-car navigation opportunities) share a certain event a remote location on their calendars. The navigation service can determine that if the users depart from their current locations, they will share a certain portion of the route. As a more specific example, users Alice and Bob can live in the same town and have a concert scheduled to take place in another town on their respective calendars. Alice and Bob are interested in multi-car navigation and are in the same social graph. The navigation service accordingly determines that the concert is a relatively strong signal to be considered in identifying a possible multi-car navigation session.

In another example scenario, the navigation service determines that two or more users (who have indicated that the navigation service can use their messaging data when identifying multi-car navigation opportunities) have referenced a certain geographic location in their messages to each other and started moving in the direction of the referenced geographic location. The navigation service can use these references to the geographic location as a signal in identifying potential multi-car navigation sessions.

When two or more users interested in multi-car navigation request navigation directions to the same destination or proximate destinations via the geographic application 160 within a certain period of time (e.g., one minute, five minutes, ten minutes), the navigation service can treat these requests as another, typically strong, signal that the navigation service should suggest a multi-car navigation session to these users. The navigation service can assign a weight to this signal depending on how close the destinations are to each other and to the starting location, and how closely in time the users submitted the corresponding requests. For example, the navigation service can assign a larger weight to the signal when Alice and Bob request navigation directions to the exact location than when Alice and Bob requests directions to proximate but non-identical locations. Further, the navigation service can assign a larger weight to the signal when Alice and Bob request navigation directions to proximate locations from starting locations that are far away than when Alice and Bob request navigation directions to the same proximate locations from starting locations that are closer. As a more specific example, when Alice and Bob request navigation directions to respective locations separated by half a mile in Mountain View, Calif. from San Francisco, Calif., the navigation service can assign a larger weight to the signal than when Alice and Bob request navigation directions to these two locations from Sunnyvale, Calif. As yet another example, when Alice and Bob request navigation directions to the same address within five minutes of each other, the navigation service can assign a first weight to the signal, but Alice and Bob request navigation directions to the same address within ten minutes of each other, the navigation service can assign a second, smaller weight to the signal.

The navigation service can determine a confidence score based on one or more signals at block 306. In general, the navigation service can consider any suitable number of signals and weigh these signals in any suitable manner. For example, the navigation service can compute a confidence score at block 306 using a signal indicating that a pair of users who are in each other's social graphs requested navigation directions to the same location within a minute of each other we well as a signal indicating that the shared portion of the route would make up approximately 60% of the overall route for one user and 65% of the overall route for the other user.

At block 308, the navigation service can determine whether the confidence score exceeds a certain threshold value. If the confidence threshold does not exceed the threshold value, the method 300 ends without suggesting multi-car navigation to the user. Otherwise, the flow proceeds to block 310, where the navigation service determines that there is a probable intent of multiple parties to travel to a shared destination within a certain amount of time of each other, and that these parties are probably interested in multi-car navigation. The navigation service accordingly sends to the parties a suggestion to form a multi-car navigation group. In another implementation, the navigation service sends the suggestion to only one user who in turn sends invitations to other users.

Referring back to FIG. 1, the navigation service in some cases can develop and apply the ML model 142 to detect potential multi-car navigation sessions. The navigation service can train the ML model 142 using the data from the sensors of the client devices 104A-C, the data from vehicle sensors such as the sensors 108 of FIG. 1, the signals discussed above (e.g., calendar entries), etc. as input data, and instances when users drive to the same or nearly same location within a certain time interval as label data. Further, the navigation service can apply users' decisions to accept or decline invitations to participate in multi-car navigation as label data.

Thus, training data in one example scenario includes an indication that several users referenced a remote geographic location, an indication that these users are in each other's social graphs, and an indication that the users drove to the location at very proximate times to each other and similar velocities, probably moving as a "caravan" or "convoy." As a more specific example, the latter indication can include the trajectories (e.g., GPS position fix/timestamp tuples) of the corresponding client devices. These trajectories can indicate the routes the users followed, the speed at which the users drove, and the stops these users made along the way. Using this type of training data, the ML model 142 can generate a confidence score for the prediction that when friends or family members reference a certain location and begin driving toward the location at a proximate times, these users intend to drive as a group.

Further, for relatively large distances, the training data can include indications that users arrived at the destination within a window of time that is short relative to the distance the users covered (e.g., the users arrived within 10 minutes of each other after driving 50 miles, within an hour of each other after driving 400 miles). In this manner, the ML model 142 can account for the situations when drivers co-navigating to a same location form a group loosely, without trying to stay in each other's eyesight when driving.

The multi-car navigation controller 140 can use the ML model 142 to identify situations when certain users may be interested in multi-car navigation. For example, the multi-car navigation controller 140 can receive an indication that several users who are in each other's social graphs requested navigation directions to the same destination from different but proximate starting locations, and apply the ML model 142 to obtain a confidence score for the prediction that these users would accept a suggestion to form a multi-car navigation group. After suggesting the multi-car navigation option to the users, the controller 140 can further apply the answers to the invitation to the ML model 142. Thus, when users tend to decline invitations generated based on certain combinations of signals, the ML model 142 can adjust the corresponding scores downward or, conversely, when users tend to accept invitations generated based on certain combinations of signals, the ML model 142 can adjust the corresponding scores upward.

Figure 4:
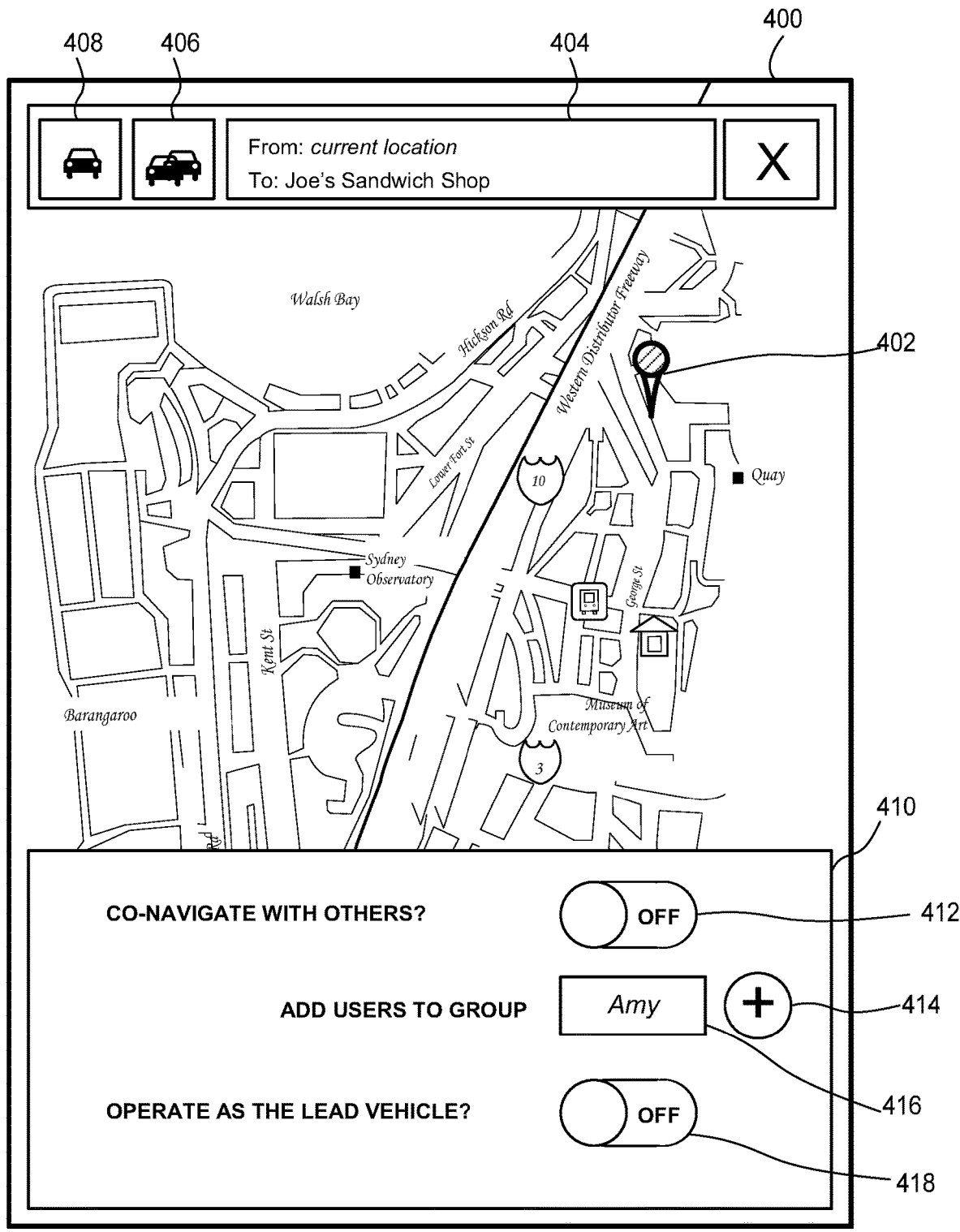
FIG. 4 is an example user interface screen which the navigation service of FIG. 1 can provide to a user when there is an opportunity to participate in a multi-car navigation session.

FIG. 4 illustrates an example user interface screen 400 which the geographic application 160 of FIG. 1 can provide via the user interface 124 when the navigation service identifies an opportunity to form a multi-car navigation group. In this example scenario, the user initiates navigation from the current location of the user's device 104A, indicated by a pin 402, to a destination specified in an input box 404. The geographic application 160 can provide a dedicated interactive control 406 for requesting the multi-car navigation option. Thus, rather than requesting navigation directions in a single-car navigation mode by actuating a control 408, the user can input the destination and actuate the control 406. The geographic application 160 in response can display a dialogue screen 410. In another scenario, the user actuates the single-car navigation control 408 (or a single control for requesting single- or multi-car navigation), and the geographic application 160 provides the dialogue screen 410 automatically based on a certain user setting or in response to a suggestion received from the navigation server 102.

The dialogue screen 410 can include an interactive control 412 for selecting the multi-car navigation option for the particular navigation request, controls 414 and 416 for specifying a group of users for co-navigation to the destination, and an interactive control 418 for specifying whether the user of the client device 104A prefers to participate in the multi-car navigation group as the driver of the lead vehicle. The dialogue screen 410 in various implementations can include additional controls or, conversely, not include some of the controls illustrated in FIG. 4. Once the user completes input via the dialogue screen 410, the geographic application 160 can transmit the request for navigation directions along with a selection of the multi-car navigation option to the navigation server 102.

Figure 5:
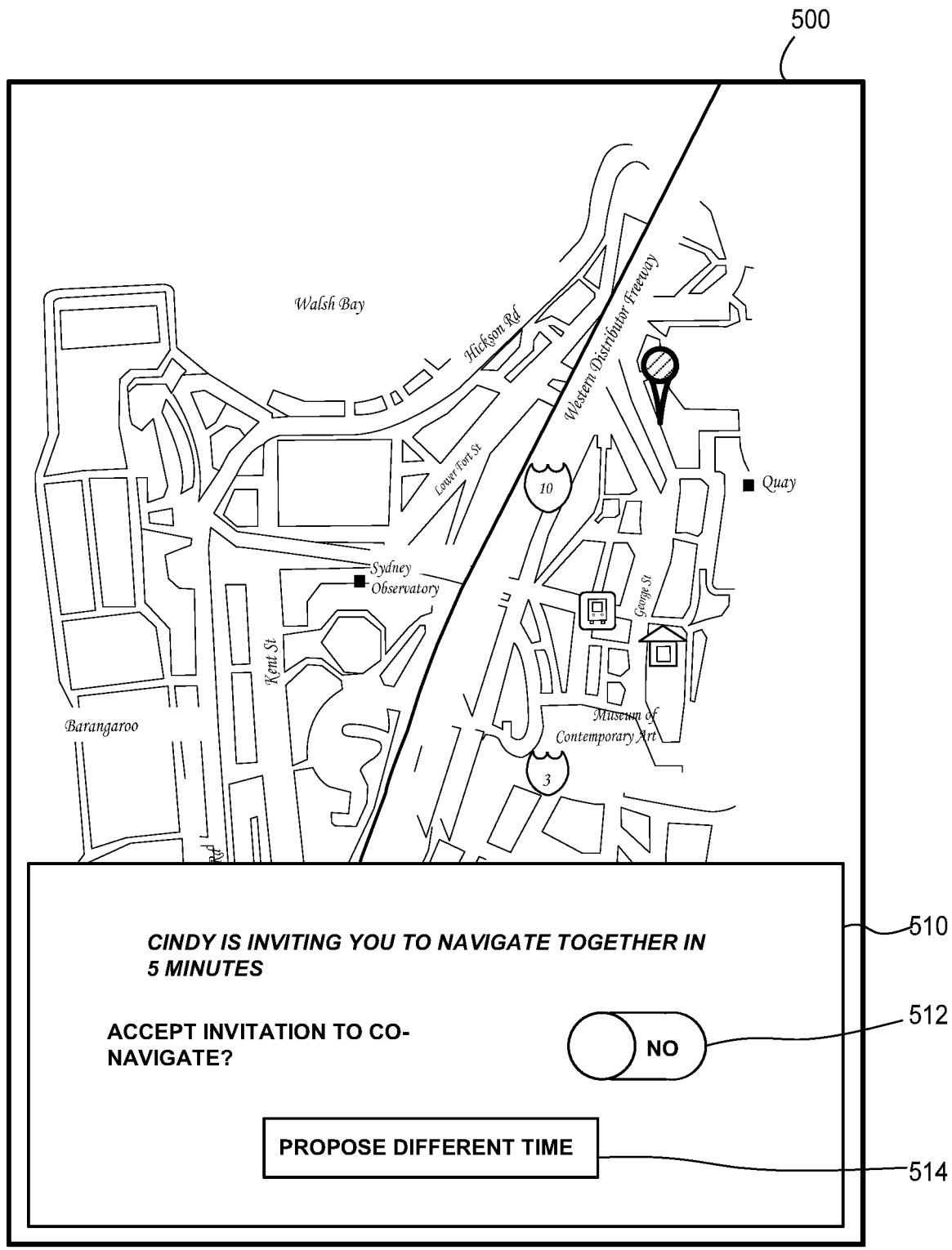
FIG. 5 is another example user interface screen which the service of FIG. 1 can provide to a user when there is an opportunity to participate in a multi-car navigation session.

FIG. 5 is an example user interface screen 500 which the geographic application 160 of FIG. 1 can provide via the user interface 124 in response to an invitation to join a multi-car navigation group. The geographic application 160 in this scenario receives an indication from the navigation server 102 that a certain user is inviting the user of the client device 104A to join a multi-car navigation group, and the geographic application 160 in response can display a dialogue screen 510. As illustrated in FIG. 5, the dialogue screen 510 can include an interactive control 512 or accepting or declining the invitation and an interactive control 514 for proposing a different time for starting co-navigation. Similar to the dialogue screen 410, the dialogue screen 510 in various implementations can include additional controls or, conversely, not include some of the controls illustrated in FIG. 5.

Figure 6:
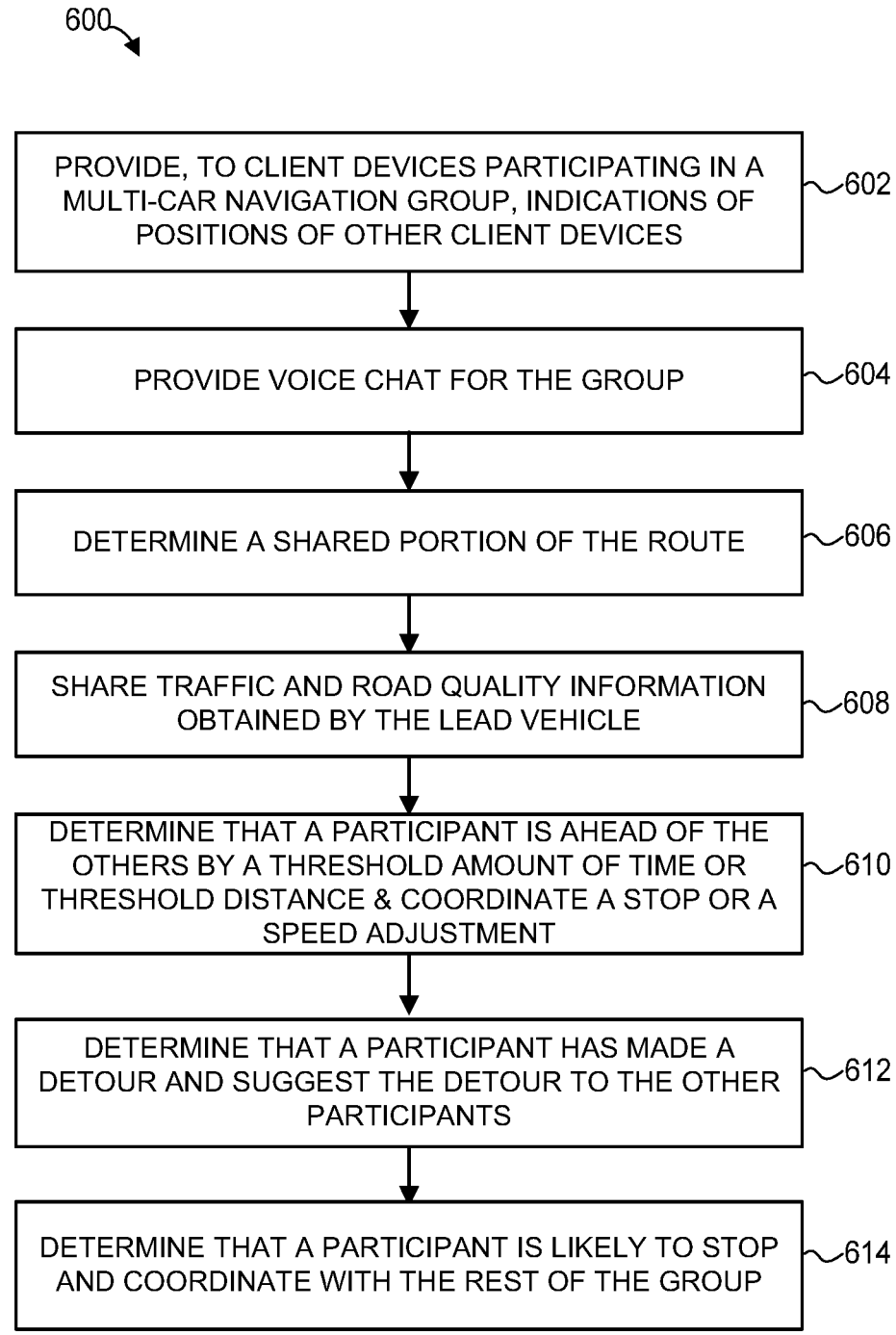
FIG. 6 is a flow diagram of an example method for providing guidance to devices participating in a multi-car navigation session, which can be implemented in the system of FIG. 1.

Now referring to FIG. 6, the multi-car navigation controller 140 further can implement a method 600 for providing guidance to client devices 104A-C during a multi-car navigation session. However, in some implementations, some of the steps of the method 140 are executed in client devices. In general, the method 600 can be implemented as a part of a navigation service in any suitable device or group of devices.

Although blocks 602-614 are illustrated in a certain order, these blocks can be executed in any suitable order, including in parallel with some of the other blocks. Further, the method 600 can include any suitable subset of the blocks 602-614, so that some of the blocks 602-614 are not executed at all. On the other hand, some of the blocks 602-614 can be executed multiple times.

Figure 7:
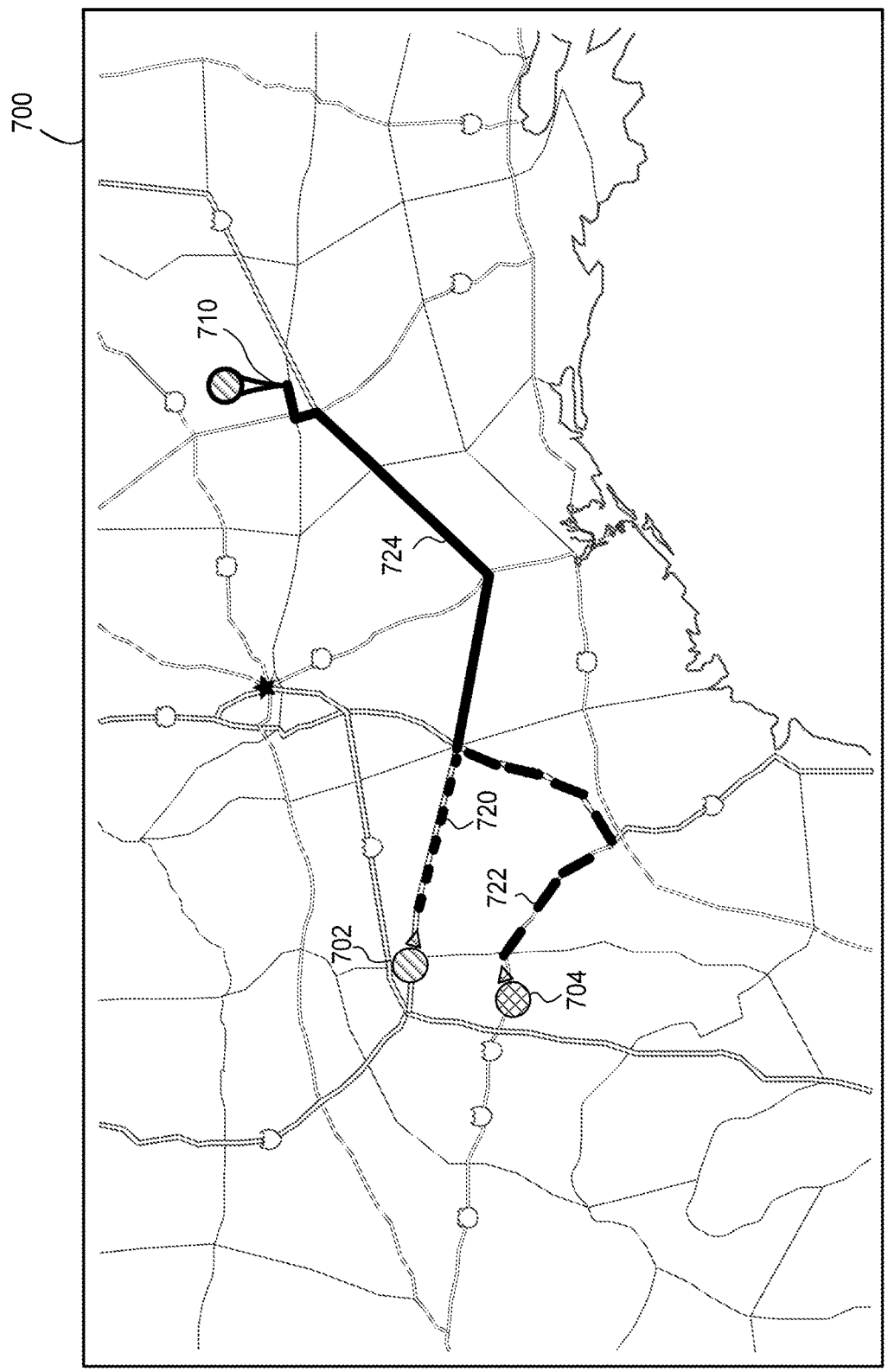
FIG. 7 is an example digital map which the service of FIG. 1 can generate to illustrate locations and respective navigation routes of multiple parties participating in a multi-car navigation session.

At block 602, the navigation service provides client devices participating in a multi-car navigation group with updates regarding current positions of other client devices participating in the multi-car navigation group. Referring to FIG. 7, for example, the geographic application 160 can display a digital map 700 via the user interface 124 during a multi-car navigation session. The geographic application 160 can display an indicator 702 of the current location of the client device 104A as well as an indicator 704 of the current location of another client device participating in the multi-car navigation group, e.g., the client device 104B. The geographic application 160 also can display an overview of the navigation routes between the current location of the client device 104A and a shared destination, represented by a pin 710, and the current location of the client device 104A and the shared destination. In this example implementation, the geographic application 160 provides an overlay 720 to illustrate the navigation route for the client device 104A and an overlay 722 to illustrate the navigation route for the client device 104B. As illustrated in FIG. 7, the navigation routes merge prior to reaching the destination at the pin 710, and the geographic application 160 accordingly provides an overlay 724 to illustrate a shared portion of the route. For clarity, the geographic application 160 can apply different styles, colors, line stroke types, etc. to the overlays 720 and 722 as well as to the indicators 702 and 704.

Referring again to FIG. 6, the navigation service at block 604 can automatically establish a chat session, e.g., establish a voice broadcast channel, for the user devices participating in the multi-car navigation group. In some implementations, the navigation service instructs each instance of the geographic application 160 at the corresponding client device to display a prompt with an invitation to activate an application or service for a voice chat.

At block 606, the navigation service can determine a shared portion of the navigation routes to the shared destination when the users operating their respective client devices in the multi-car navigation group depart from different locations. FIG. 7 discussed above corresponds to a scenario in which two navigation routes begin at different starting locations, end at a shared destination, and include a shared portion illustrated by the overlay 724. In one implementation, the navigation service generates a respective navigation route for each client device in the group independently of every other client device in the group, and then determines the overlap by comparing the navigation routes segment by segment. In another implementation, the navigation service generates navigation routes for the participating client devices using the potential navigation routes of the other client devices in the group as constraints. More particularly, rather than generating individual navigation routes for the client devices while optimizing each individual route in terms of a certain parameter (e.g., time), the navigation service can generate the multiple navigation routes together while optimizing the entire set in terms of this parameter.

With continued reference to FIG. 6, at block 608 the navigation service can facilitate the sharing of road and traffic information obtained by the client device operating in the lead vehicle with the other user devices operating in the multi-car navigation group. The navigation server 102 in some cases may not have real-time traffic data or, for some road segments, have no traffic information at all. The lead vehicle of a multi-car navigation group may be ahead of the rest of the group by a relatively short distance, and thus the information regarding the road that the client device in the lead vehicle obtains likely is relevant to the rest of the group. For example, if the client device 104A operates in the lead vehicle, the client device 104A can use the sensors of the client device 104A (e.g., the positioning module, the gyroscope) and/or the sensors 110 of the vehicle to determine whether the vehicle has slowed down because of traffic, whether the road appears to have potholes, etc. Provided the user indicated his willingness to share the sensor data, the client device 104A can transmit the sensor data to the navigation server 102, and the navigation server 102 in turn can determine traffic conditions and the road quality based on the sensor data and provide the determined traffic conditions and road quality to the other devices in the multi-car navigation group. The other devices can display these updates on the respective maps or, in some cases, automatically generate voice announcements based on these updates. For example, the client device 104A operating as the lead vehicle can automatically periodic traffic updates to the client device 1046, and the geographic application at the client device 1046 can automatically generate voice announcements such as "lead vehicle reports delays two miles ahead." Of course, as discussed above with reference to block 604, the user of the client device 104A also can report the current traffic conditions and the observed road quality to the other users via a chat.

At block 610, the navigation service can determine that the lead vehicle in the multi-car navigation group is ahead of the second vehicle in the group by more than a threshold distance or of time. The threshold distance or time in some implementations can depend on the overall distance of the shared portion of the navigation route. In response to determining that the lead vehicle is too far ahead, the navigation service can automatically suggest that the participants reduce the gap between the vehicles. To this end, the navigation service can provide, via the client device operating in the lead vehicle, a suggestion that the driver reduce the speed to allow the other participants in the multi-car navigation group to catch up. More generally, the navigation service can estimate the amount of time available to the driver of the lead vehicle for the other participants to catch up and generate one or more suggestions regarding possible uses of this time (e.g., take a scenic detour, stop at a historical site). Alternatively, the navigation service can identify a location suitable for waiting (e.g., a gas station, a rest area) along the shared portion of the navigation route and provide, to all the vehicles in the group, a suggestion that the drivers meet at the identified location.

The navigation service at block 612 can determine that a participant in a multi-car navigation group has deviated from the shared portion of the navigation route. The navigation service at block 612 in some cases can automatically incorporate the detour into the navigation route of each participant, or at least provide a suggestion to do so to the participants. For example, if the navigation service determines that the client device 104A operates in the lead vehicle and has made a detour relative to the shared portion of the navigation route, the navigation service can send a notification to every other participant in the group and provide a suggestion to calculate a new route incorporating the detour of the client device 104A.

At block 614, the navigation service can receive an explicit request from one of the participants in the multi-car navigation group to find a suitable place at which the group can stop for a certain purpose (e.g., to get gas, eat, rest), or the navigation service can determine that one of the participants is likely to stop due to an implicit signal such as the low level of gas. The navigation service can identify a suitable location, similar to the scenarios discussed above with reference to block 610. When identifying a suitable location, the navigation service can consider distance, availability of parking, preferences of the users operating the respective client devices, etc.

Figure 8:
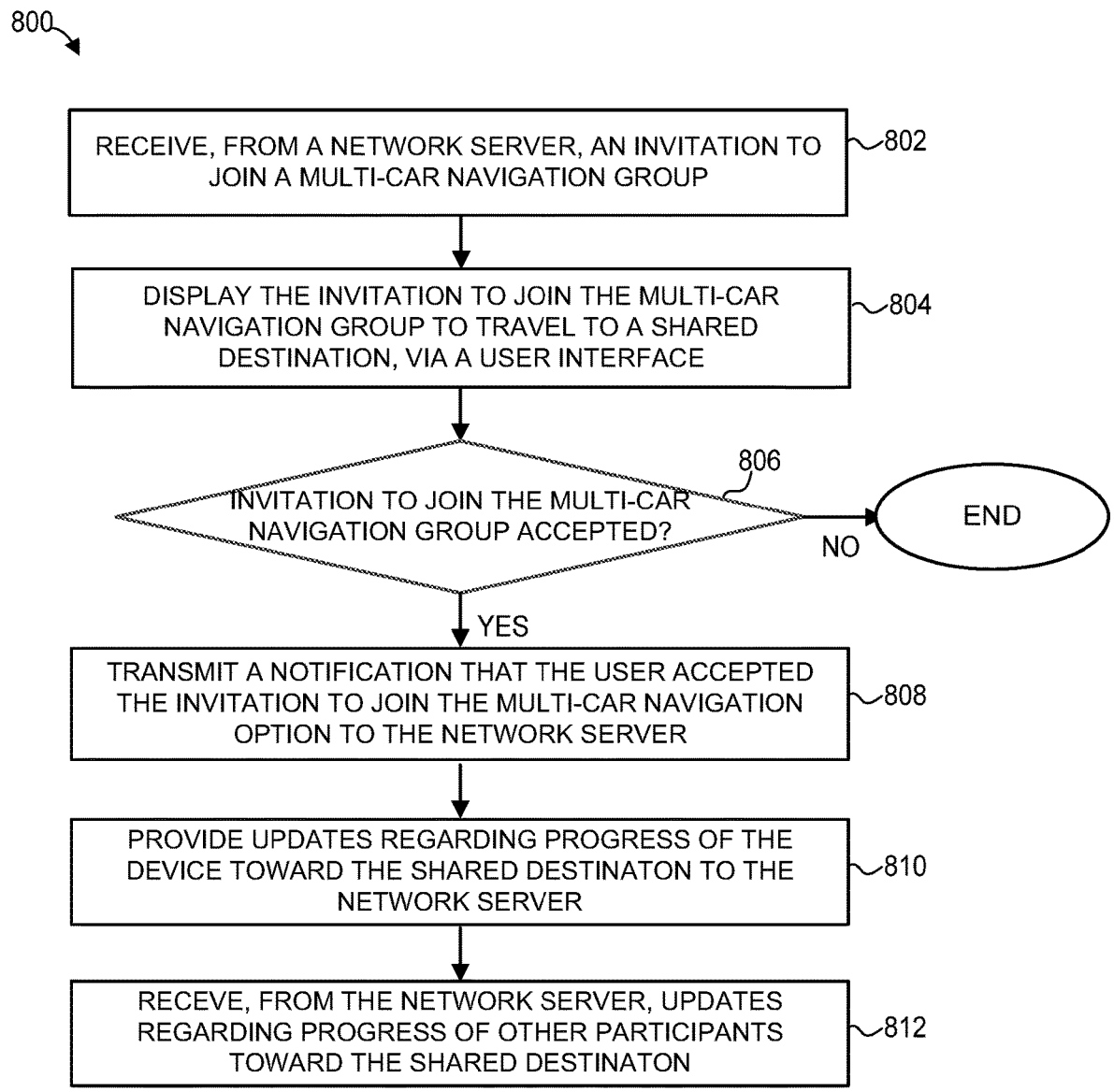
FIG. 8 is a flow diagram of an example method for joining a multi-car navigation group, which can be implemented in a client device of FIG. 1.
Figure 9:
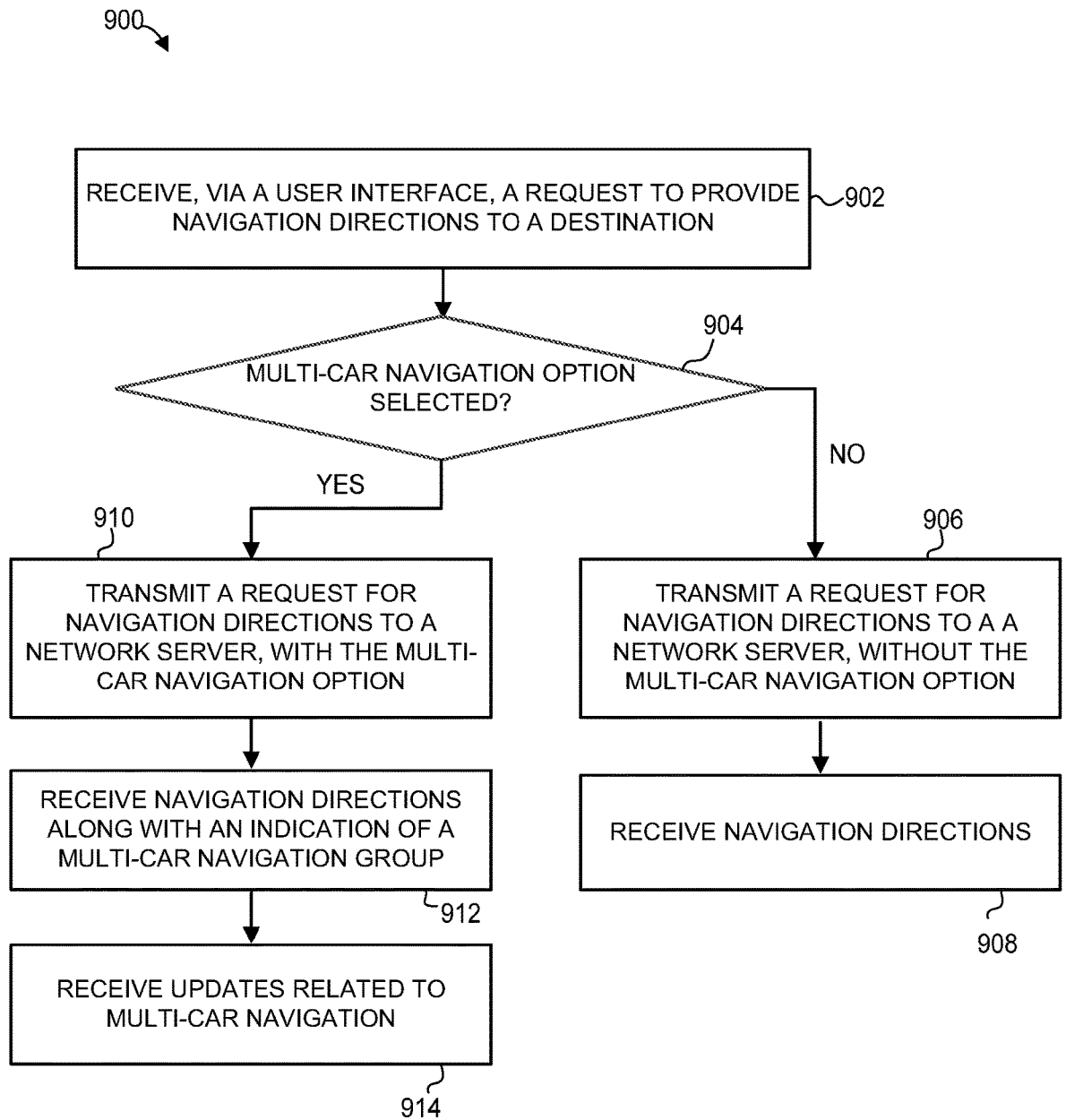
FIG. 9 is a flow diagram of an example method for requesting navigation directions with a multi-car navigation option, which can be implemented in a client device of FIG. 1.

For further clarity, FIGS. 8 and 9 illustrate methods for joining multi-car navigation groups that can be implemented in the geographic application 160. These methods in general can be implemented in any suitable devices.

Referring first to FIG. 8, the method 800 begins at block 802, where the geographic application 160 receives an invitation to join a multi-car navigation group from the navigation server 102. The invitation can specify for example a destination, the actual and prospective participants in the multi-car navigation group, a proposed departure time, and the location at which the navigation routes to the shared destination are expected to merge. In some cases, the invitation can include a reference to a location where the participants of the multi-car navigation group can meet.

The geographic application 160 can display the invitation to join the multi-car navigation group at block 804. An example screen the geographic application can generate is illustrated in FIG. 5, for example. If the user declines the invitation at block 806, the method 800 completes. Otherwise, if the user accepts the invitation, the flow proceeds to block 808, where the geographic application 160 transmits a notification that the user has accepted the invitation to the navigation server 102. In some cases, the notification can include a new proposed departure time (see FIG. 5) or another proposed modification to the details included in the invitation.

At block 810, the geographic application 160 can provide updates regarding progress of the corresponding client device toward the shared destination and, in some cases and according to user selection, sensor data which the navigation server 102 can use to assess traffic and road quality. At block 812, the geographic application 160 can receive updates regarding progress of the other client devices operating in the multi-car navigation group from the navigation server 102. In some cases, the geographic application 160 also can receive traffic and road quality updates which the navigation server 102 generates using sensor data from another client device in the group. The geographic application 160 can execute blocks 810 and 812 in either order and any number of times during a multi-car navigation session, until the navigation server 102 or the user of the client device dissolves the multi-group navigation group.

According to a method 900 of FIG. 9, the geographic application 160 at block 902 receives a request for navigation directions from a user via the user interface 122 (rather than an invitation from the navigation server 102 as according to the method of FIG. 8). At block 904, the geographic application 160 can determine whether the user explicitly or implicitly selected the multi-car navigation option (see FIG. 4). If the user has not selected the multi-car navigation option, the flow proceeds to block 906, where the geographic application 160 transmits a request for single-car navigation directions to the navigation server 102, and accordingly receives these navigation directions at block 908.

Otherwise, if the user explicitly or implicitly selected the multi-car navigation option at block 904, the flow proceeds to block 910. The geographic application at block 910 transmits a request for navigation directions to the navigation server 102 and specifies the multi-car navigation option. In some implementations, the request transmitted at block 910 includes an indication of which user or group of users should be invited, at what time the user proposes to start multi-car navigation, and other suitable options (e.g., avoid tolls, optimize for speed).

At block 912, the geographic application 160 receives the requested navigation directions. The geographic application 160 also can receive an indication of whether a multi-car navigation group was formed and, if so, a listing of the participants in the group. The geographic application 160 then can receive updates related to the multi-car navigation sessions, as discussed above.

Although the discussion above pertains to vehicles, at least some of these techniques can be applied to bicycling directions and, in some cases, public transport directions.

More particularly, users in some cases can request directions to a certain destination using public transport options, and the navigation server 102 can determine when users can leave to meet at a certain intermediate location, what train or bus for example the users can board together to traverse the shared portion of the navigation route, etc.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components and modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configured on a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods discussed above may include one or more function blocks, modules, individual functions or routines in the form of tangible computer-executable instructions that are stored in a non-transitory computer-readable storage medium and executed using a processor of a computing device (e.g., a server, a personal computer, a smart phone, a tablet computer, a smart watch, a mobile computing device, or other personal computing device, as described herein). The methods discussed above may be included as part of any backend server (e.g., a map data server, a navigation server, or any other type of server computing device, as described herein), portable device modules of the example environment, for example, or as part of a module that is external to such an environment. Though the figures may be described with reference to the other figures for ease of explanation, the methods discussed above can be utilized with other objects and user interfaces. Furthermore, although the explanation above describes steps of the methods discussed above being performed by specific devices, this is done for illustration purposes only.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for coordinating multi-car navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of operation of a navigation system to coordinate navigation between multiple users, the method comprising:
    determining, by one or more processors, that a first user intends to navigate to a shared destination from a first location, at a first time;
    determining, by the one or more processors, that a second user intends to navigate to the shared destination from a second location, at a second time within a threshold interval of the first time;
    applying a machine learning model to first data related to the first user and second data related to the second user to generate a confidence score indicative of a probability that the first user and the second user will choose to coordinate navigation to the shared destination;
    notifying, by the one or more processors, the first user using an electronic notification that the second user intends to navigate to the shared destination;
    receiving, from the first user, an electronic request to coordinate navigation to the shared destination with the second user; and
    in response to receiving the electronic request, providing, during navigation, navigation directions to the shared destination to a device associated with the first user in view of a progress of the second user toward the shared destination.

2. The method of claim 1, wherein determining that the first user intends to navigate to the shared destination includes determining that the first user and the second user have respective calendar entries referencing the shared destination.

3. The method of claim 1, wherein determining that the first user intends to navigate to the shared destination includes determining that electronic messaging between the first user and the second user references the shared destination.

4. The method of claim 1, wherein determining that the first user intends to navigate to the shared destination includes receiving a request from the first user, submitted via a user interface of the device operated by the first user, to coordinate navigation to the shared destination with the second user.

5. The method of claim 1, wherein the first and the second data include one or more of (i) sensor data from respective user devices, (ii) calendar entries for the first user and the user second user, or (iii) messaging between the first user and the second user; wherein the notification of the first user that the second user intends to navigate to the shared destination is in response to determining that the confidence score is above a certain threshold value.

6. The method of claim 1, further comprising:
    determining that the first user will arrive at the shared destination earlier than the second user, and
    providing an indication that the first user will arrive at the shared destination earlier to the device associated with the first user.

7. The method of claim 6, wherein providing navigation directions to the shared destination to the first user includes:
    determining that the first user is ahead of the second user by at least a threshold distance or drive time;
    identifying a location at which the first user can wait for the second user; and
    notifying the first user of the identified location.

8. The method of claim 7, wherein identifying the location at which the first user can wait for the second user includes identifying a gas station along the shared route where both the first user and the second user can arrive within a certain period of time.

9. The method of claim 1, further comprising:
    determining, by the one or more processors, a first route from the first location to the destination and a second route from the second location to the shared destination;
    identifying, by the one or more processors, a shared route corresponding to at least a portion of the first route shared with the second route; and
    providing an indication of the shared route to the respective devices associated with the first user and the second user.

10. The method of claim 9, further comprising:
    in response to determining that the device associated with the first user traversed a segment of the shared route while the device associated with the second user has not yet reached the segment:
    obtaining road quality and/or traffic data for the segment, and
    providing the road quality and/or traffic data to a device associated with the second user.

11. The method of claim 1, further comprising:
    determining, by the one or more processors, a first route from the first location to the destination and a second route from the second location to the shared destination;
    identifying, by the one or more processors, a shared route corresponding to at least a portion of the first route shared with the second route; and
    providing an indication of the shared route to the respective devices associated with the first user and the second user.

12. The method of claim 1, further comprising:
    determining, by the one or more processors, that the first user is likely to stop on a way to the shared destination;
    determining a location at which the first user and a second user can stop; and providing an indication of the location to the device associated with the first user and to the device associated with the second user.

13. The method of claim 1, wherein providing navigation directions to the shared destination to the first user includes:
determining that the first user is ahead of the second user by at least a threshold distance or drive time;
identifying a point where the first user and the second user can arrive at proximate times; and
modifying the navigation directions to generate a detour for the first user to arrive at the identified point later than along an original route of the first user.

14. The method of claim 1, further comprising:
in response to receiving the electronic request, automatically setting up a voice chat for the first user and the second user.

15. The method of claim 1, further comprising:
determining, by the one or more processors, a first route from the first location to the destination and a second route from the second location to the shared destination;
identifying, by the one or more processors, a shared route corresponding to at least a portion of the first route shared with the second route;
determining that the first user has deviated from the shared route to follow a detour for a portion of the shared route; and
modifying navigation directions for the second user based on the detour.

16. The method of claim 1, further comprising:
determining that the first user has arrived at the shared destination; and
providing an interactive prompt to the first user for reporting parking spaces.

17. A system comprising:
one or more computing devices;
and a non-transitory computer-readable medium storing instructions that, when executed by the one or more computing devices, cause the system to:
determine that a first user intends to navigate to a shared destination from a first location, at a first time,
determine that a second user intends to navigate to the shared destination from a second location, at a second time within a threshold interval of the first time,
apply a machine learning model to first data related to the first user and second data related to the second user to generate a confidence score indicative of a probability that the first user and the second user will choose to coordinate navigation to the shared destination,
notify the first user using an electronic notification that the second user intends to navigate to the shared destination,
receive, from the first user, an electronic request to coordinate navigation to the shared destination with the second user, and
in response to receiving the electronic request, provide, during navigation, navigation directions to the shared destination to a device associated with the first user in view of a progress of the second user toward the shared destination.

18. The system of claim 17, wherein to determine that the first user intends to navigate to the shared destination, the instructions cause the system to determine that the first user and the second user have respective calendar entries referencing the shared destination.

19. The system of claim 17, wherein to determine that the first user intends to navigate to the shared destination, the instructions cause the system to determine that electronic messaging between the first user and the second user references the shared destination.

20. The system of claim 17, wherein to determine that the first user intends to navigate to the shared destination, the instructions cause the system to receive a request from the first user, submitted via a user interface of the device operated by the first user, to coordinate navigation to the shared destination with the second user.

21. The method of claim 1, further comprising:
applying the first user's request to coordinate navigation as label data to the machine learning model.

* * * * *